United States Patent
Takahashi et al.

(10) Patent No.: US 12,543,036 B2
(45) Date of Patent: Feb. 3, 2026

(54) TERMINAL AND COMMUNICATION METHOD

(71) Applicant: NTT DOCOMO, INC., Tokyo (JP)

(72) Inventors: Hideaki Takahashi, Tokyo (JP); Akihito Hanaki, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 507 days.

(21) Appl. No.: 17/998,218

(22) PCT Filed: Oct. 7, 2020

(86) PCT No.: PCT/JP2020/038054
§ 371 (c)(1),
(2) Date: Nov. 8, 2022

(87) PCT Pub. No.: WO2021/240836
PCT Pub. Date: Dec. 2, 2021

(65) Prior Publication Data
US 2023/0232212 A1   Jul. 20, 2023

(30) Foreign Application Priority Data
May 26, 2020  (JP) .................................. 2020-091761

(51) Int. Cl.
*H04W 8/22* (2009.01)
(52) U.S. Cl.
CPC ..................... *H04W 8/22* (2013.01)
(58) Field of Classification Search
CPC .......... H04W 8/24; H04W 8/22; H04W 16/28
See application file for complete search history.

(56) References Cited

U.S. PATENT DOCUMENTS

| | | | | |
|---|---|---|---|---|
| 2020/0169926 A1* | 5/2020 | Hwang | ............. | H04W 36/0079 |
| 2020/0351858 A1* | 11/2020 | Tsai | ...................... | H04W 72/20 |
| 2021/0226682 A1* | 7/2021 | Park | ...................... | H04L 5/005 |

(Continued)

FOREIGN PATENT DOCUMENTS

JP   2015522955 A   8/2015

OTHER PUBLICATIONS

3GPP TSG RAN WG1 Meeting #100bis-e; R1-2002910 "Summary of LS on CSI-RS capabilities (FG 2-33/36/40/41/43)" Moderator (NTT DOCOMO); e-Meeting; Apr. 20-30, 2020 (13 pages).

(Continued)

*Primary Examiner* — Congvan Tran
(74) *Attorney, Agent, or Firm* — Osha Bergman Watanabe & Burton LLP

(57) ABSTRACT

A terminal includes a receiving unit that receives, from a base station, a message that requests a report on terminal capability; a control unit that includes information for reporting a parameter for a codebook per band and information for reporting a parameter for a codebook per band combination in a message for reporting the terminal capability, the information for reporting the parameter for the codebook per band and the information for reporting the parameter for the codebook per band combination being included based on information for specifying a type of a codebook included in the message that requests the report on the terminal capability; and a transmitting unit that transmits the message for reporting the terminal capability to the base station.

6 Claims, 15 Drawing Sheets

(56) References Cited

U.S. PATENT DOCUMENTS

| | | | |
|---|---|---|---|
| 2022/0053477 A1* | 2/2022 | Yao | H04B 7/0626 |
| 2022/0166486 A1* | 5/2022 | Sun | H04B 7/0417 |
| 2023/0144233 A1* | 5/2023 | Manolakos | H04B 7/0626 |
| | | | 375/262 |

OTHER PUBLICATIONS

3GPP TS 38.300 V15.9.0 "3rd Generation Partnership Project; Technical Specification Group Radio Access Network; NR; NR and NG-RAN Overall Description; Stage 2 (Release 15)" Mar. 2020 (100 pages).

3GPP TS 38.331 V15.9.0 "3rd Generation Partnership Project; Technical Specification Group Radio Access Network; NR; Radio Resource Control (RRC) protocol specification (Release 15)" Mar. 2020 (536 pages).

3GPP TS 38.306 V15.9.0 "3rd Generation Partnership Project; Technical Specification Group Radio Access Network; NR; User Equipment (UE) radio access capabilities (Release 15)" Mar. 2020 (61 pages).

International Search Report issued in International Application No. PCT/JP2020/038054, mailed Dec. 8, 2020 (5 pages).

Written Opinion issued in International Application No. PCT/JP2020/038054; Dated Dec. 8, 2020 (4 pages).

Office Action issued in Japanese Patent Application No. 2022-527477, mailed on Dec. 5, 2023 (7 pages).

* cited by examiner

FIG.5

```
                  UE-CapabilityRequestFilterCommon information element

UE-CapabilityRequestFilterCommon ::=       SEQUENCE {
    mrdc-Request                            SEQUENCE {
        omitEN-DC        ENUMERATED {true}  OPTIONAL,   -- Need N
        includeNR-DC     ENUMERATED {true}  OPTIONAL,   -- Need N
        includeNE-DC     ENUMERATED {true}  OPTIONAL,   -- Need N
    }
    ...,
    [[
    codebookTypeRequest-r16                 SEQUENCE {
        type1-SinglePanel-r16   ENUMERATED {true} OPTIONAL,  -- Need N
        type1-MultiPanel-r16    ENUMERATED {true} OPTIONAL,  -- Need N
        type2-r16               ENUMERATED {true} OPTIONAL,  -- Need N
        type2-PortSelection-r16 ENUMERATED {true} OPTIONAL   -- Need N
    }
    ]]
}
```

FIG.6

| UE-CapabilityRequestFilterCommon field descriptions |
|---|
| codebookTypeRequest<br>If this field is present, the UE includes SupportedCSI-RS-Resource supported for the codebook type(s) requested within this field (i.e. type I single/multi-panel, type II and type II port selection) into codebookVariantsList, codebookParametersPerBand and codebookParametersPerBC. If this field is present and none of the codebook types is requested within this field (i.e. empty field), the UE includes SupportedCSI-RS-Resource supported for all codebook types into codebookVariantsList, codebookParametersPerBand and codebookParametersPerBC. |

FIG.7

MIMO-ParametersPerBand information element

```
MIMO-ParametersPerBand ::=      SEQUENCE {
[...]
    codebookParametersPerBand-r16   CodebookParameters-v16xy    OPTIONAL
}
```

FIG.8

CA-ParametersNR information element

```
CA-ParametersNR-v16xy ::=      SEQUENCE {
    codebookParametersPerBC-r16      CodebookParameters-v16xy      OPTIONAL
}
```

FIG.9

CodebookParameters information element

```
CodebookParameters-v16xy ::=    SEQUENCE {
    supportedCSI-RS-ResourceListAlt-r16    SEQUENCE {
        type1-SinglePanel-r16
            SEQUENCE (SIZE (1.. maxNrofCSI-RS-Resources)) OF INTEGER (0..511) OPTIONAL,
        type1-MultiPanel-r16
            SEQUENCE (SIZE (1.. maxNrofCSI-RS-Resources)) OF INTEGER (0..511) OPTIONAL,
        type2-r16
            SEQUENCE (SIZE (1.. maxNrofCSI-RS-Resources)) OF INTEGER (0..511) OPTIONAL,
        type2-PortSelection-r16
            SEQUENCE (SIZE (1.. maxNrofCSI-RS-Resources)) OF INTEGER (0..511) OPTIONAL
    } OPTIONAL
}

CodebookVariantsList-r16 ::=
    SEQUENCE (SIZE (1.. maxNrofCSI-RS-ResourcesAlt-r16)) OF SupportedCSI-RS-Resource SupportedCSI-RS-Resource ::=          SEQUENCE {
    maxNumberTxPortsPerResource        ENUMERATED {p2, p4, p8, p12, p16, p24, p32},
    maxNumberResourcesPerBand          INTEGER (1..64),
    totalNumberTxPortsPerBand          INTEGER (2..256)
}
```

FIG.10

| CodebookParameters field descriptions |
|---|
| *supportedCSI-RS-ResourceListAlt*<br>This field indicates the alternative list of SupportedCSI-RS-Resource supported for each codebook type. SupportedCSI-RS-Resource is indicated by an integer value which pinpoints SupportedCSI-RS-Resource defined in CodebookVariansList. The value 0 corresponds to the first entry of CodebookVariansList. The value 1 corresponds to the second entry of CodebookVariansList, and so on. For each codebook type, this fields shall be included in both codebookParametersPerBC and codebookParametersPerBand. |

FIG.11

| Definitions for parameters | Per | M | FDD-TDD DIFF | FR1-FR2 DIFF |
|---|---|---|---|---|
| codebookParameters<br>Indicates the codebooks and the corresponding parameters supported by the UE.<br><br>Parameters for type I single panel codebook (type1 singlePanel) supported by the UE, which are mandatory to report:<br>- *supportedCSI-RS-ResourceList*;<br>- *modes* indicates supported codebook modes (mode 1, both mode 1 and mode 2);<br>- *maxNumberCSI-RS-PerResourceSet* indicates the maximum number of CSI-RS resource in a resource set.<br><br>[...]<br>*supportedCSI-RS-ResourceList* includes list of the following parameters:<br>- *maxNumberTxPortsPerResource* indicates the maximum number of Tx ports in a resource;<br>- *maxNumberResourcesPerBand* indicates the maximum number of resources across all CCs within a band simultaneously;<br>- *totalNumberTxPortsPerBand* indicates the total number of Tx ports across all CCs within a band simultaneously.<br>For each codebook type, the UE may report another list of supported CSI-RS resources via *supportedCSI-RS-ResourceListAlt*. | Band | FD | No | No |

FIG.12

| Definitions for parameters | Per | M | FDD-TDD DIFF | FR1-FR2 DIFF |
|---|---|---|---|---|
| supportedCSI-RS-ResourceListAlt<br>Indicates the list of supported CSI-RS resources across all bands in a band combination. The following parameters are included for each code book type:<br>- *maxNumberTxPortsPerResource* indicates the maximum number of Tx ports in a resource across all bands within a band combination;<br>- *maxNumberResourcesPerBand* indicates the maximum number of resources across all CCs within a band combination, simultaneously;<br>- *totalNumberTxPortsPerBand* indicates the total number of Tx ports across all CCs within a band combination, simultaneously.<br>For each band in a band combination, supported values for these three parameters are determined in conjunction with *supportedCSI-RS-ResourceListAlt* reported in *MIMO-ParametersPerBand*. | BC | No | No | No |

FIG.13

| Definitions for parameters | Per | M | FDD-TDD DIFF | FR1-FR2 DIFF |
|---|---|---|---|---|
| *codebookVariantsList-r16*<br>Indicates the list of *SupportedCSI-RS-Resource* applicable to the codebook types supported by the UE. | UE | No | No | No |

TERMINAL AND COMMUNICATION METHOD

TECHNICAL FIELD

The present invention relates to a terminal and a communication method in a radio communication system.

BACKGROUND ART

For New Radio (NR) (also referred to as "5G") that is a successor system to Long Term Evolution (LTE), technology has been studied that satisfies the following requirements: a high capacity system; a high data transfer rate; low latency; simultaneous connection of multiple terminals; low cost; power saving, and the like (Non-Patent Document 1).

In the LTE system or the NR system, a network queries a User Equipment (UE) and obtains information on radio access capability of the UE (e.g., Non-Patent Document 2). The radio access capability of the UE includes, for example, a supported maximum data rate; a total layer 2 buffer size; a supported band combination; a parameter related to a Packet Data Convergence Protocol (PDCP) layer; a parameter related to a Radio Link Control (RLC) layer; a parameter related to a Medium Access Control (MAC) layer; a parameter related to a physical layer, and the like (Non-Patent Document 3).

PRIOR ART DOCUMENT

Non-Patent Document

Non-Patent Document 1: 3GPP TS 38.300 V15.9.0 (March 2020)
Non-Patent Document 2: 3GPP TS 38.331 V15.9.0 (March 2020)
Non-Patent Document 3: 3GPP TS 38.306 V15.9.0 (March 2020)

SUMMARY OF THE INVENTION

Problem to be Solved by the Invention

In related art, there is a case in which, when a network attempts to obtain information related to radio access capability of a terminal, additional information related to radio access capability of the terminal is required, in order to adjust a terminal operation to a network operation.

The present invention has been accomplished in view of the above-described point, and an object is to obtain a report on terminal capability in a radio communication system by a network.

Means for Solving the Problem

According to the disclosed technology, there is provided a terminal including a receiving unit that receives, from a base station, a message that requests a report on terminal capability; a control unit that includes information for reporting a parameter for a codebook per band and information for reporting a parameter for a codebook per band combination in a message for reporting the terminal capability, the information for reporting the parameter for the codebook per band and the information for reporting the parameter for the codebook per band combination being included based on information for specifying a type of a codebook included in the message that requests the report on the terminal capability; and a transmitting unit that transmits the message for reporting the terminal capability to the base station.

Advantage of the Invention

According to the disclosed technology, a network can obtain a report on terminal capability in a radio communication system.

BRIEF DESCRIPTION OF DRAWINGS

FIG. 5 is a diagram illustrating an example (1) of a modification of a technical specification for terminal capability report according to an embodiment of the present invention.

FIG. 6 is a diagram illustrating an example (2) of a modification of a technical specification for terminal capability report according to an embodiment of the present invention.

FIG. 7 is a diagram illustrating an example (3) of a modification of a technical specification for terminal capability report according to an embodiment of the present invention.

FIG. 8 is a diagram illustrating an example (4) of a modification of a technical specification for terminal capability reporting according to an embodiment of the present invention.

FIG. 9 is a diagram illustrating an example (5) of a modification a technical specification for terminal capability reporting according to an embodiment of the present invention.

FIG. 10 is a diagram illustrating an example (6) of a modification of a technical specification for terminal capability reporting according to an embodiment of the present invention.

FIG. 11 is a diagram illustrating an example (7) of a modification of a technical specification for terminal capability reporting according to an embodiment of the present invention.

FIG. 12 is a diagram illustrating an example (8) of a modification of a technical specification for terminal capability reporting according to an embodiment of the present invention.

FIG. 13 is a diagram illustrating an example (9) of a modification of a technical specification for terminal capability reporting according to an embodiment of the present invention.

EMBODIMENTS OF THE INVENTION

In the following, embodiments of the present invention are described with reference to the drawings. Note that the embodiments described below are examples, and embodiments to which the present invention is applied are not limited to the embodiments below.

In operating a radio communication system according to an embodiment of the present invention, existing technology is used as appropriate. The existing technology is, for example, an existing LTE, but is not limited to an existing LTE. The term "LTE" as used in this specification has a broad meaning, including LTE-Advanced and a scheme subsequent to LTE-Advanced (e.g., NR), unless otherwise indicated.

In the embodiments of the present invention described below, terms used in the existing LTE are used, such as Synchronization signal (SS), Primary SS (PSS), Secondary SS (SSS), Physical broadcast channel (PBCH), Physical random access channel (PRACH), Physical Downlink Control Channel (PDCCH), Physical Downlink Shared Channel (PDSCH), Physical Uplink Control Channel (PUCCH), Physical Uplink Shared Channel (PUSCH), or the like. This is for convenience of description, and signals, functions, or the like similar to these may be referred to by other names. The above-described terms in NR correspond to NR-SS, NR-PSS, NR-SSS, NR-PBCH, NR-PRACH, NR-PDCCH, NR-PDSCH, NR-PUCCH, NR-PUSCH, or the like, respectively. However, even if a signal is used for NR, the signal is not always specified as "NR-."

Furthermore, in the embodiments of the present invention, a duplex scheme may be a Time Division Duplex (TDD) scheme, a Frequency Division Duplex (FDD) scheme, or any other (e.g., Flexible Duplex) scheme.

Furthermore, in the embodiments of the present invention, to "configure" a radio parameter or the like may be to pre-configure a predetermined value, or to configure a radio parameter signaled from a base station 10 or a terminal 20.

Figure 1:
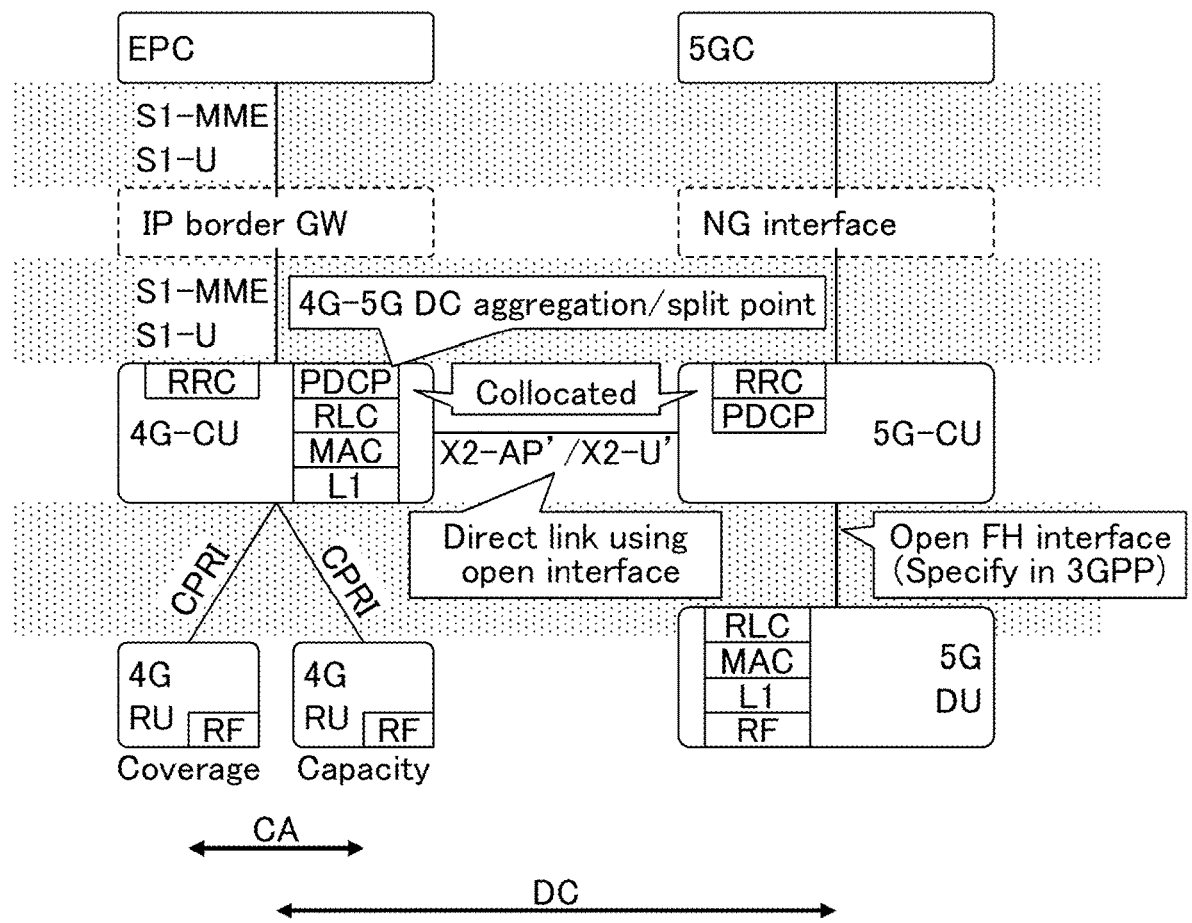
FIG. 1 is a diagram illustrating an example of a configuration of a network architecture according to an embodiment of the present invention.

FIG. 1 is a diagram illustrating an example of a configuration of a network architecture in the embodiments of the present invention. As illustrated in FIG. 1, a radio network architecture according to an embodiment of the present invention includes 4G-CU, 4G-Remote Unit (RU), remote radio station), an Evolved Packet Core (EPC), and the like, at an LTE-Advanced side. The radio network architecture according to the embodiment of the present invention includes 5G-CU, 5G-DU, and the like, at a 5G side.

As illustrated in FIG. 1, 4G-CU includes layers up to the Radio Resource Control (RRC), Packet Data Convergence Protocol (PDCP), Radio Link Control (RLC), Medium Access Control (MAC), and Layer 1 (L1, PHY layer or physical layer) and is connected to 4G-RU via Common Public Radio Interface (CPRI). A network node including 4G-CU and 4G-RU is referred to as eNB.

In the 5G side, as illustrated in FIG. 1, 5G-CU includes an RRC layer; is connected to 5G-DU via a Fronthaul (FH) interface; and is connected to 5G Core Network (% GC) via an NG interface. 5G-CU is also connected to 4G-CU via an X2 interface. The PDCP layer in 4G-CU is a coupling point or a separation point for performing 4G-5G Dual Connectivity (DC), i.e., E-UTRA-NR Dual Connectivity (EN-DC). A network node including 5G-CU and 5G-DU are referred to as gNB. 5G-CU may also be referred to as gNB-CU, and the 5G-DU may be referred to as gNB-DU.

As illustrated in FIG. 1, a Carrier Aggregation (CA) is performed between 4G and RU, and DC is performed between 4G-RU and 5G-DU. Note that, though it is not depicted, a User Equipment (UE) is wirelessly connected via 4G-RU RF or 5G-DU RF to transmit and receive packets.

Note that FIG. 1 illustrates a radio network architecture for LTE-NR DC, i.e., E-UTRA-NR Dual Connectivity (EN-DC). However, a similar radio network architecture may be used when 4G-CU is separated into CU-DU or when NR standalone operation is performed. When the 4G-CU is separated into CU-DU, functions related to the RRC layer and the PDCP layer may be moved to 4G-CU and the RLC layer or lower may be included in 4G-DU. Here, a CPRI data rate may be reduced by CU-DU separation.

A plurality of 5G-DUs may be connected to 5G-CU. Furthermore, NR-NR Dual Connectivity (NR-DC) may be performed by connecting a UE to a plurality of 5G-CUs, or NR-DC may be performed by connecting a UE to a plurality of 5G-DUs and a single 5G-CU. 5G-CU may be directly connected to EPC without going through 4G-CU, or 4G-CU may be directly connected to 5GC without going through 5G-CU.

Furthermore, FIG. 1 illustrates a radio network architecture during EN-DC. However, the radio network architecture is not limited to this. For example, the radio network architecture may be NR-DC or NR-EUTRA Dual Connectivity (NE-DC), or another radio network architecture may be adopted. Here, the radio network architecture may be operated not for DC, but the radio network architecture may be operated in standalone mode.

Figure 2:
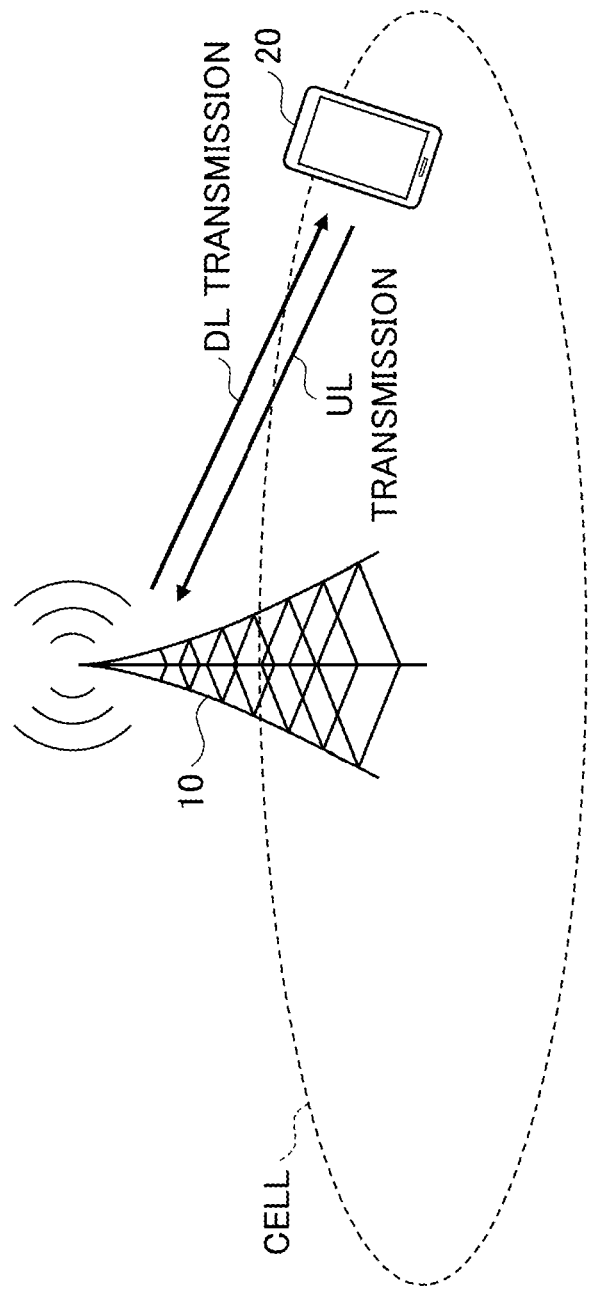
FIG. 2 is a diagram illustrating an example of a configuration of a radio communication system according to an embodiment of the present invention.

FIG. 2 is a diagram for illustrating a radio communication system according to an embodiment of the present invention. The radio communication system according to the embodiment of the present invention includes a base station 10 and a terminal 20, as illustrated in FIG. 2. In FIG. 2, one base station 10 and one terminal 20 are illustrated. However, this is an example, and there may be a plurality of base stations 10 and a plurality of terminals 20.

The base station 10 is a communication device that provides one or more cells and performs radio communication with the terminal 20. Physical resources of a radio signal are defined in a time domain and a frequency domain, the time domain may be defined in terms of a OFDM symbol number, and the frequency domain may be defined in terms of a sub-carrier number or a resource block number. The base station 10 transmits a synchronization signal and system information to the terminal 20. The synchronization signals are, for example, NR-PSS and NR-SSS. System information is transmitted, for example, on NR-PBCH and is also referred to as broadcast information. As illustrated in FIG. 2, the base station 10 transmits a control signal or data in Downlink (DL) to the terminal 20 and receives a control signal or data in Uplink (UL) from the terminal 20. Both the base station 10 and the terminal 20 are capable of beamforming to transmit and receive signals. Furthermore, both the base station 10 and the terminal 20 may also apply MIMO (Multiple Input Multiple Output) communications to DL or UL. Furthermore, both the base station 10 and the terminal 20 may perform communication via a Secondary Cell (SCell) and a Primary Cell (PCell) by Carrier Aggregation (CA).

The terminal 20 is a communication device provided with a radio communication function, such as a smartphone, a cellular phone, a tablet, a wearable terminal, a communication module for Machine-to-Machine (M2M), or the like. As illustrated in FIG. 2, the terminal 20 utilizes various communication services provided by a radio communication system by receiving control signals or data in DL from the base station 10 and transmitting control signals or data in UL to the base station 10.

Figure 3:
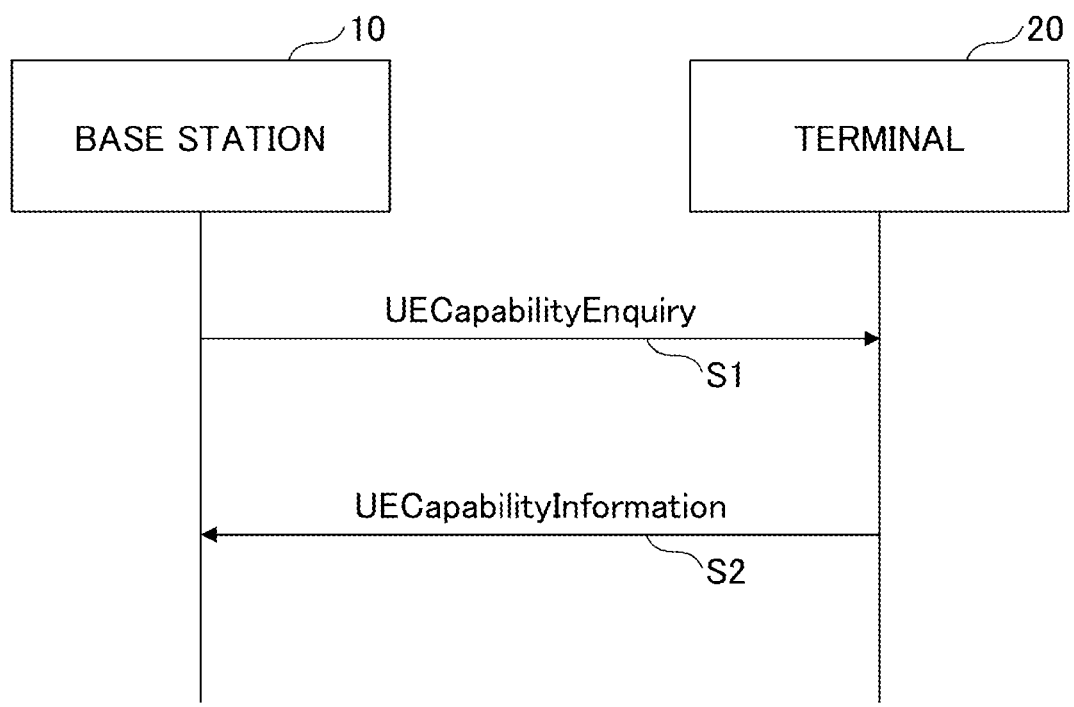
FIG. 3 is a sequence diagram for illustrating an example of terminal capability reporting according to an embodiment of the present invention.

FIG. 3 is a sequence diagram illustrating an example of terminal capability reporting according to an embodiment of the present invention. In step S1 illustrated in FIG. 3, the base station 10 transmits a "UECpabilityEnquiry," i.e., a query for UE capability to the terminal 20. Subsequently, in step S2, the terminal 20 transmits "UECpabilityInformation," i.e., a UE capability report to the base station 10, in regard to the UE capability specified by the received "UECpabilityEnquiry." The "UECpabilityInformation" includes UE capabilities supported by the terminal 20. The base station 10 identifies the supported UE capability based on the received "UECpability information" and the base station 10 applies the supported UE capability to radio communication with the terminal 20.

For example, in the "UECapabilityInformation," an information element "CodebookParameters" for reporting, on a per band basis, a parameter of UE capability related to MIMO (multiple input and multiple output) is specified.

The "CodebookParameters" reports the UE capability to the network for each of the following MIMO operation modes 1)-4).

1) Type1 single-panel
2) Type1 multi-panel
3) Type2
4) Type2 port selection

For example, for each of the types of 1)-4), a method of reporting a codebook, a precoder, a Precoding Matrix Indicator (PMI), or the like may be specified. Furthermore, reporting of the above-described 1) may be mandatory, and reporting of the above-described 2)-4) may be optional.

Furthermore, the information element "SupportedCSI-RS-Resource" configured for each of the above-described 1)-4) is a parameter for specifying a resource for a Channel State Information Reference Signal (CSI-RS) supported by the terminal 20, and the information element "SupportedCSI-RS-Resource" may be formed of the following elements a)-c).
  a) a maximum number of transmission ports per CSI-RS resource (maxNumberTxPortsPerResource);
  b) a maximum number of CSI-RS resources per band (maxNumberResourcesPerBand); and
  c) a total number of transmission ports per band (totalNumberTxPortsPerBand).

For example, as a maximum number of transmission ports per CSI-RS resource, any one of {2, 4, 8, 12, 16, 24, 32} can be selected. For example, as a maximum number of CSI-RS resources per band, any number from 1 to 64 can be selected. For example, as a total number of transmission port per band, any number from 2 to 256 may be selected.

Here, the "CodebookParameters" is capable of reporting up to eight items of "SupportedCSI-RS-Resource" for each of the above-described MIMO operation modes 1)-4). Accordingly, a signaling size of the "UECapabilityInformation" becomes large. Note that, depending on a parameter for MIMO operation in a network, there may be an unnecessary combination. Accordingly, in related art, UE capability that is not used by a network may be reported. For example, a total number of transmission ports per band specified by the "SupportedCSI-RS-Resource" indicates a total number of transmission antennas per one frequency band at the base station 10 side that can be received by the terminal 20. However, the number of transmission antennas at the base station 10 side is almost fixed during operation. Accordingly, even if the terminal 20 reports the number of transmission ports that is greater than the number of operated transmission antennas, the reported number of transmission antennas is not used at the network.

Accordingly, information element "UE-CapabilityRequestFilterCommon" that is included in the "UECapabilityEnquiry" and that is used by a network to request a report on filtered UE capability from a UE is used, so that the UE capability that is unnecessary for the network is prevented from being reported from the terminal 20 to the base station 10.

For example, a new information element "codebookTypeRequest" is added to the "UE-CapabilityRequestFilterCommon," and a MIMO operation mode to be reported by the terminal 20 is indicated by the "CodebookParameters." Namely, the "codebookTypeRequest" may be information that additionally specifies a type of each parameter reported by the terminal 20 by the "CodebookParameters."

For example, the "codebookTypeRequest" may specify one of additional reports, from among Type1 single-panel, Type1 multi-panel, Type2, and Type2 port selection, that is requested.

Accordingly, by transmitting the "UECapabilityEnquiry" configured with the "codebookTypeRequest" to the terminal 20, the base station 10 can prevent the terminal 20 from reporting a parameter for an unnecessary codebook for an unoperated mode. Furthermore, by transmitting, by the base station 10, the "UECapabilityEnquiry" configured with the "codebookTypeRequest" to the terminal 20, the terminal 20 can be caused to report a parameter for a necessary codebook for an operated mode.

Figure 4:
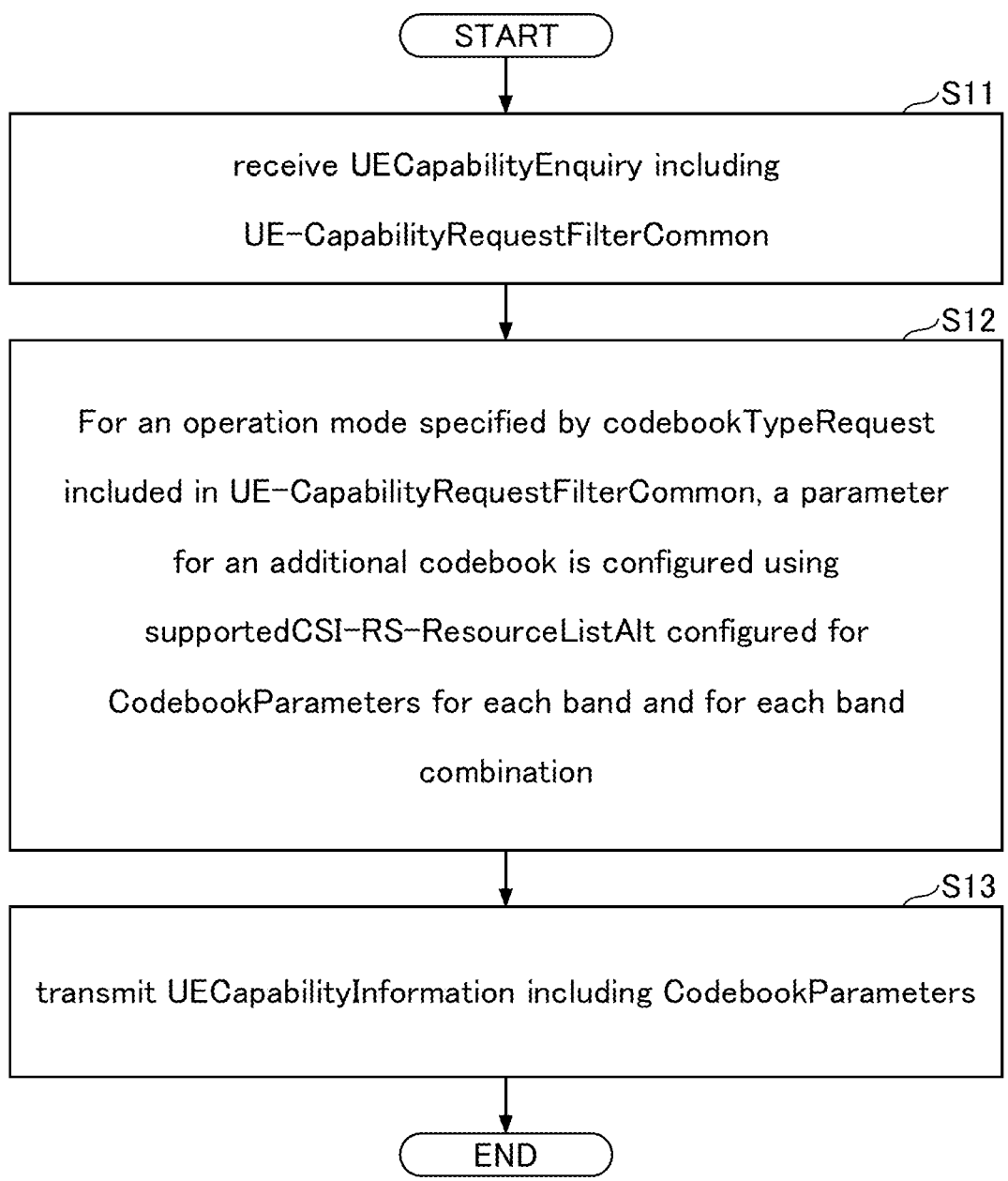
FIG. 4 is a flowchart for illustrating an example of terminal capability reporting according to an embodiment of the present invention.

FIG. 4 is a flowchart for illustrating an example of terminal capability reporting according to an embodiment of the present invention. By using FIG. 4, an example of an operation is described in which the above-described UE capability that is unnecessary for the network is prevented from being reported from the terminal 20 to the base station 10.

At step S11, the terminal 20 receives the "UECapabilityEnquiry" including the "UE-CapabilityRequestFilterCommon." The "UE-CapabilityRequestFilterCommon" is an example of an information element, and the "UE-CapabilityRequestFilterCommon" may be an information element having a different name.

Subsequently, at step S12, the terminal 20 configures, for an operation mode specified by the "codebookTypeRequest" included in the "UE-CapabilityRequyestFilterCommon," a parameter for an additional codebook by using the "supportedCSI-RS-ResourceListAlt" configured for the "CodebookParameters," which is configured on a per band and per band combination basis.

For example, the terminal 20 may configure, for the "supportedCSI-RS-ResourceListAlt" corresponding to one of Type1 single-panel, Type1 multi-panel, Type2, and Type2 port selection specified by the "codebookTypeRequest," a parameter for a supported additional codebook.

Subsequently, at step S13, the terminal 20 transmits the "UECapabilityInformation" including the "CodebookParameters" configured with the "supportedCSI-RS-ResourceListAlt" to the base station 10.

FIG. 5 is a diagram illustrating an example (1) of a modification of a technical specification for terminal capability report according to an embodiment of the present invention. As illustrated in FIG. 5, the information element "UE-CapabilityRequestFilterCommon" may include the "codebookTypeRequest." The "codebookTypeRequest"

may be configured with information indicating to request capability reports individually for Type1 single-panel, Type1 multi-panel, Type2, and Type2 port selection. Note that the "NeedN" implies that the action is not retained and one time only, and, if the information element is not configured, the terminal 20 need not perform any action.

FIG. 6 is a diagram illustrating an example (2) of a modification of a technical specification for terminal capability report according to an embodiment of the present invention. As illustrated in FIG. 6, the terminal 20 may include a CSI-RS resource supported a type of a codebook specified by the information element "codebookTypeRequest" in the "codebookVariantsList," which is configured on a per band and per band combination basis.

Furthermore, if the information element "codebookTypeRequest" is configured and a type of a codebook is not specified (e.g., empty field), the terminal 20 may include a CSI-RS resource supported by all the supported codebooks in the "codebookVariantsList," which is configured on a per band and per band combination basis.

FIG. 7 is a diagram illustrating an example (3) of a modification of a technical specification for terminal capability report according to an embodiment of the present invention. As illustrated in FIG. 7, the "CodebookParameters" may be included in the information element "MIMO-ParametersPerBand," which is for configuring on a per band basis. The "CodebookParameters" includes the "codebookVariantsList," and, thus, by the "MIMO-ParametersPerBand," the "codebookVariantsList" can be configured on a per band basis.

FIG. 8 is a diagram illustrating an example (4) of a modification of a technical specification for terminal capability report according to an embodiment of the present invention. As illustrated in FIG. 8, the "CodebookParameters" may be included in the information element "CAParametersNR," which is for configuring on a per band combination basis. The "CodebookParameters" includes the "codebookVariantsList," and, thus, by the "CAParametersNR," the "codebookVariantsList" can be configured on a per band combination basis.

FIG. 9 is a diagram illustrating an example (5) of a modification of a technical specification for terminal capability report according to an embodiment of the present invention. As illustrated in FIG. 9, the information element "CodebookParameters" includes the "supportedCSI-RS-ResourceListAlt." The "supportedCSI-RS-ResourceListAlt" is capable of specifying a used portion of a sequence of CSI-RS resources configured by the "CodebookVariantsList" individually for Type1 single-panel, Type1 multi-panel, Type2, and Type2 port selection. Note that the value "511" may be a constant (maxNrofCSI-RS-ResourcesAlt)−1.

Furthermore, as illustrated in FIG. 9, the "CodebookVariantsList" indicates a sequence formed of maxNrofCSI-RS-ResourcesAlt (e.g., 512) pieces of the "SupportedCSI-RS-Resource." By the "supportedCSI-RS-ResourceListAlt" included in the "SupportedCSI-RS-Resource" configured for the "CodebookVariantsList," the "SupportedCSI-RS-Resource" used for each type of a codebook can be configured.

FIG. 10 is a diagram illustrating an example (6) of a modification of a technical specification for terminal capability report according to an embodiment of the present invention. As illustrated in FIG. 10, the "supportedCSI-RS-ResourceListAlt" can configure an additional CSI-RS resource for each type of a codebook. For example, if a value configured for a type of a codebook of the "supportedCSI-RS-ResourceListAlt" is "0," it indicates that a first entry of the "CodebookVariantsList," i.e., the first "SupportedCSI-RS-Resource" in the sequence is supported. Furthermore, for example, if a value configured for a type of a codebook of the "supportedCSI-RS-ResourceListAlt" is "1," it indicates that a second entry of the "CodebookVariantsList," i.e., the second "SupportedCSI-RS-Resource" in the sequence is supported.

Note that the "supportedCSI-RS-ResourceListAlt" is included in the "CodebookParameters," which is configured on a per band and per band combination basis. Accordingly, the "supportedCSI-RS-ResourceListAlt" can be configured on a per band and per band combination basis.

FIG. 11 is a diagram illustrating an example (7) of a modification of a technical specification for terminal capability report according to an embodiment of the present invention. As illustrated in FIG. 11, in the "CodebookParameters," the terminal 20 may additionally report a list of supported CSI-RS resources by using the "supportedCSI-RS-ResourceListAlt" per codebook.

FIG. 12 is a diagram illustrating an example (8) of a modification of a technical specification for terminal capability report according to an embodiment of the present invention. As illustrated in FIG. 12, the "supportedCSI-RS-ResourceListAlt" indicates a CSI-RS resource supported for all bands in a band combination. The terminal 20 may determine, for each band in a band combination, three parameters that are a maximum number of transmission ports per CSI-RS resource, a maximum number of CSI-RS resources per band, and a total number of transmission ports per band by combining the "supportedCSI-RS-ResourceListAlt" included in the "MIMO-ParametersPerBand" with the "supportedCIS-RS-ResourceListAlt" corresponding to the band combination.

FIG. 13 is a diagram illustrating an example (9) of a modification of a technical specification for terminal capability report according to an embodiment of the present invention. As illustrated in FIG. 13, the "CodebookVariantsList" is a list of "SupportedCSI-RS-Resource" applied to a type of a codebook supported by the terminal 20.

By the above-described embodiments, depending an operation mode of a network, the terminal 20 can report necessary MIMO UE capability to the network, and the terminal 20 can avoid reporting unnecessary MIMO UE capability.

Namely, a network can obtain a report of terminal capability in a radio communication system.

Device Configuration

Next, an example of a functional configuration of the base station 10 and the terminal 20 for performing the processes and operations described above is described. The base station 10 and terminal 20 include functions for implementing the embodiments described above. However, each of the base stations 10 and the terminal 20 may include only a part of the functions in the embodiments.

Base Station 10

Figure 14:
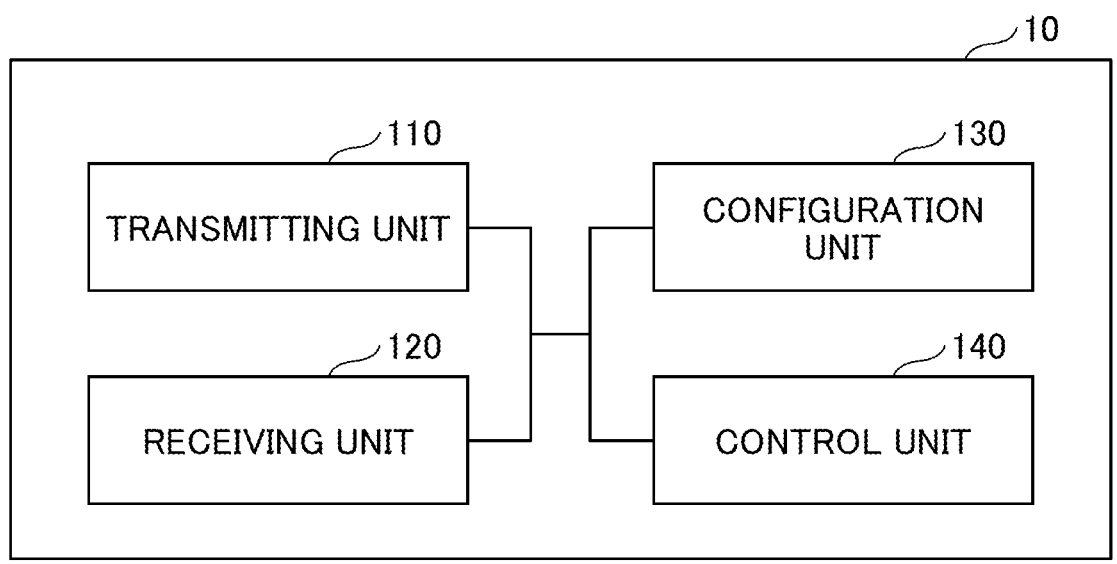
FIG. 14 is a diagram illustrating an example of a functional configuration of a base station 10 according to an embodiment of the present invention.

FIG. 14 is a diagram illustrating an example of a functional configuration of the base station 10 according to an embodiment of the present invention. As illustrated in FIG. 14, the base station 10 includes a transmitting unit 110; a receiving unit 120; a configuration unit 130; and a control unit 140. The functional configuration illustrated in FIG. 14 is only one example. If the operation according to the embodiments of the present invention can be executed, the functional division and the name of the functional units may be any division and names.

The transmitting unit 110 includes a function for generating a signal to be transmitted to the terminal 20 and wirelessly transmitting the signal. The transmitting unit 110 transmits a message between network nodes to the other network nodes. The receiving unit 120 includes a function for receiving various signals transmitted from the terminal 20 and retrieving, for example, information of a higher layer from the received signals. The transmitting unit 110 has a function to transmit NR-PSS, NR-SSS, NR-PBCH, DL/UL control signals, or the like to the terminal 20. The receiving unit 120 receives a message between network nodes from other network nodes.

The configuration unit 130 stores preconfigured configuration information and various types of configuration information to be transmitted to the terminal 20. The content of the configuration information is, for example, information related to a transmission and reception configuration according to UE capability of the terminal 20.

As described in the embodiment, the control unit 140 performs control related to processing of a UE capability report for radio parameters received from the terminal 20. Furthermore, the control unit 140 controls the communication with the terminal 20 based on the UE capability report for the radio parameters received from the terminal 20. A functional unit related to signal transmission in the control unit 140 may be included in the transmitting unit 110, and a functional unit related to signal reception in the control unit 140 may be included in the receiving unit 120.

Terminal 20

Figure 15:
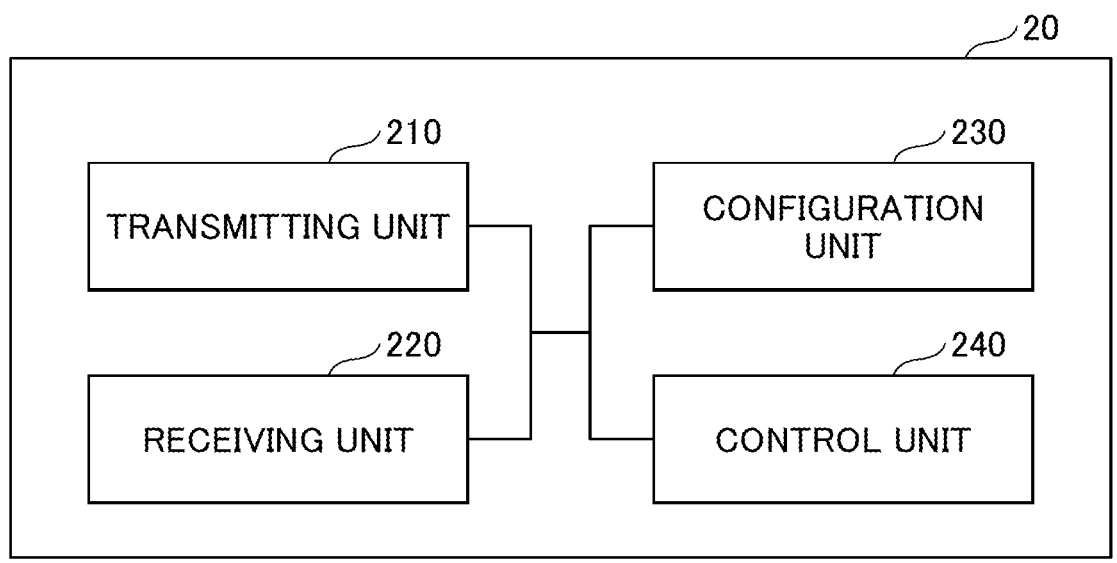
FIG. 15 is a diagram illustrating an example of a functional configuration of a terminal 20 according to an embodiment of the present invention.

FIG. 15 is a diagram illustrating an example of a functional configuration of a terminal 20 according to an embodiment of the present invention. As illustrated in FIG. 15, the terminal 20 includes a transmitting unit 210; a receiving unit 220; a configuration unit 230; and a control unit 240. The functional configuration illustrated in FIG. 15 is only one example. If the operation according to the embodiments of the present invention can be performed, the functional division and the name of the functional units may be any division and names.

The transmitting unit 210 creates a transmission signal from transmission data and transmits the transmission signal through radio. The receiving unit 220 receives various signals through radio and retrieves higher layer signals from the received physical layer signals. The receiving unit 220 has a function to receive NR-PSS, NR-SSS, NR-PBCH, DL/UL/SL control signals, or the like transmitted from the base station 10. For example, the transmitting unit 210 transmits Physical Sidelink Control Channel (PSCCH), Physical Sidelink Shared Channel (PSSCH), Physical Sidelink Discovery Channel (PSDCH), Physical Sidelink Broadcast Channel (PSBCH), or the like to the other terminal 20 as D2D communication, and the receiving unit 120 receives PSCCH, PSSCCH, PSDCH, PSDCH, or the like from the other terminal 20.

The configuration unit 230 stores various types of configuration information received from the base station 10 by the receiving unit 220. The configuration unit 230 also stores preconfigured configuration information. The content of the configuration information is, for example, information related to a transmission and reception configuration according to the UE capability.

The control unit 240 performs control for a UE capability report related to radio parameters of the terminal 20, as described in the embodiments. A functional unit related to signal transmission in the control unit 240 may be included in the transmitting unit 210, and a functional unit related to signal reception in the control unit 240 may be included in the receiving unit 220.

Hardware Configuration

Block diagrams (FIGS. 14 and 15) used in the description of the above embodiments illustrate blocks of functional units. These functional blocks (components) are implemented by any combination of at least one of hardware and software. In addition, an implementation method of each function block is not particularly limited. That is, each functional block may be implemented using a single device that is physically or logically combined, or may be implemented by directly or indirectly connecting two or more devices that are physically or logically separated (e.g., using wire and/or radio) and using these multiple devices. The functional block may be implemented by combining software with the above-described one device or the above-described plurality of devices.

Functions include, but are not limited to, judgment, decision, determination, computation, calculation, processing, derivation, research, search, verification, reception, transmission, output, access, resolution, choice, selection, establishment, comparison, assumption, expectation, deeming, broadcasting, notifying, communicating, forwarding, configuring, reconfiguring, allocating, mapping, assigning, and the like. For example, a functional block (component) that functions to transmit is called a transmitting unit or a transmitter. In either case, as described above, the implementation method is not particularly limited.

Figure 16:
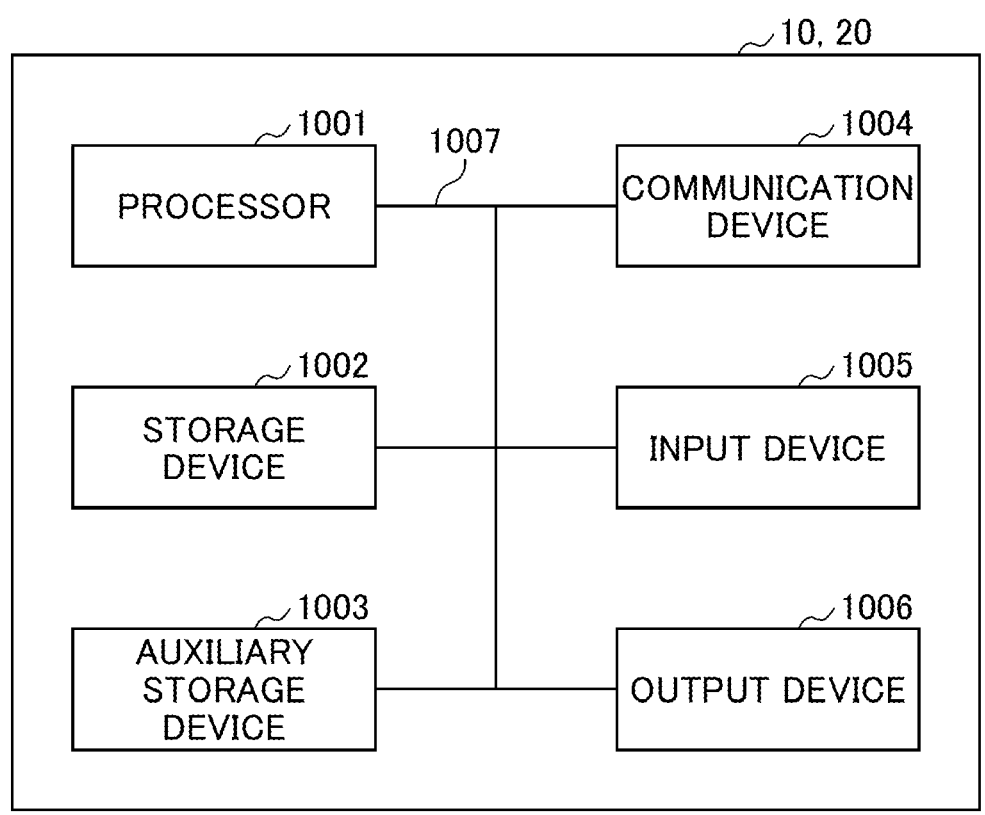
FIG. 16 is a diagram illustrating an example of a hardware configuration of the base station 10 or the terminal 20 according to an embodiment of the present invention.

For example, the base station 10, the terminal 20, or the like, according to the embodiments of the present invention may function as a computer that performs processing of the radio communication method according to the present disclosure. FIG. 16 is a diagram illustrating an example of a hardware configuration of the base station 10 and the terminal 20 according to an embodiment of the present disclosure. The base station 10 and the terminal 20 may each be configured as a computer device including, physically, a processor 1001, a storage device 1002, an auxiliary storage device 1003, a communication device 1004, an input device 1005, an output device 1006, a bus 1007, and the like.

In the following description, the term "device" can be replaced with a circuit, a device, a unit, or the like. The hardware configuration of the base station 10 and terminal 20 may be configured to include one or more of the devices depicted in the figure, or may be configured without some devices.

Each function of the base station 10 and the terminal 20 is implemented by loading predetermined software (program) on hardware, such as the processor 1001, the storage device 1002, or the like, so that the processor 1001 performs computation and controls communication by the communication device 1004, and at least one of reading and writing of data in the storage device 1002 and the auxiliary storage device 1003.

The processor 1001, for example, operates an operating system to control the entire computer. The processor 1001 may be configured with a central processing unit (CPU: Central Processing Unit) including an interface with a peripheral device, a control device, a processing device, a register, and the like. For example, the above-described control unit 140, control unit 240, or the like, may be implemented by the processor 1001.

Additionally, the processor 1001 reads a program (program code), a software module, data, or the like from at least one of the auxiliary storage device 1003 and the communication device 1004 to the storage device 1002, and executes various processes according to these. As the program, a program is used which causes a computer to execute at least a part of the operations described in the above-described embodiments. For example, the control unit 140 of the base station 10 illustrated in FIG. 14 may be implemented by a control program that is stored in the storage device 1002 and that is operated by the processor 1001. Furthermore, for example, the control unit 240 of the terminal 20 illustrated in FIG. 15 may be implemented by a control program that is stored in the storage device 1002 and that is operated by the processor 1001. While the various processes described above are described as being executed in one processor 1001, they may be executed simultaneously or sequentially by two or more processors 1001. The processor 1001 may be implemented by one or more chips. The program may be transmitted from a network via a telecommunications line.

The storage device 1002 is a computer readable storage medium, and, for example, the storage device 1002 may be formed of at least one of a Read Only Memory (ROM), an Erasable Programmable ROM (EPROM), an Electrically Erasable Programmable ROM (EEPROM), a Random Access Memory (RAM), and the like. The storage device 1002 may be referred to as a register, a cache, a main memory (main storage device), or the like. The storage device 1002 may store a program (program code), a software module, or the like, which can be executed for implementing the communication method according to one embodiment of the present disclosure.

The auxiliary storage device 1003 is a computer readable storage medium and may be formed of, for example, at least one of an optical disk, such as a Compact Disc ROM (CD-ROM), a hard disk drive, a flexible disk, an optical magnetic disk (e.g., a compact disk, a digital versatile disk, a Blu-ray (registered trademark) disk, a smart card, a flash memory (e.g., a card, a stick, a key drive), a floppy (registered trademark) disk, a magnetic strip, and the like. The above-described storage medium may be, for example, a database including at least one of the storage device 1002 and the auxiliary storage device 1003, a server, or any other suitable medium.

The communication device 1004 is hardware (transmitting and receiving device) for performing communication between computers through at least one of a wired network and a wireless network, and is also referred to, for example, as a network device, a network controller, a network card, a communication module, or the like. The communication device 1004 may be configured to include, for example, a high frequency switch, a duplexer, a filter, a frequency synthesizer, or the like, to implement at least one of frequency division duplex (FDD: Frequency Division Duplex) and time division duplex (TDD: Time Division Duplex). For example, a transmitting/receiving antenna, an amplifier unit, a transceiver unit, a transmission line interface, or the like may be implemented by the communication device 1004. The transceiver unit may be implemented so that the transmitting unit and the receiving unit are physically or logically separated.

The input device 1005 is an input device (e.g., a keyboard, a mouse, a microphone, a switch, a button, and/or a sensor) that receives an external input. The output device 1006 is an output device (e.g., a display, speaker, and/or LED lamp) that performs output toward outside. The input device 1005 and the output device 1006 may be integrated (e.g., a touch panel).

Each device, such as the processor 1001 and the storage device 1002, is also connected by the bus 1007 for communicating information. The bus 1007 may be formed of a single bus or may be formed of different buses between devices.

The base station 10 and the terminal 20 may each include hardware, such as a microprocessor, a digital signal processor (DSP: Digital Signal Processor), an Application Specific Integrated Circuit (ASIC), a Programmable Logic Device (PLD), and a Field Programmable Gate Array (FPGA), which may implement some or all of functional blocks. For example, the processor 1001 may be implemented by using at least one of these hardware components.

Conclusion of the Embodiments

As described above, according to the embodiments of the present invention, there is provided a terminal including a receiving unit that receives, from a base station, a message that requests a report on terminal capability; a control unit that includes information for reporting a parameter for a codebook per band and information for reporting a parameter for a codebook per band combination in a message for reporting the terminal capability, the information for reporting the parameter for the codebook per band and the information for reporting the parameter for the codebook per band combination being included based on information for specifying a type of a codebook included in the message that requests the report on the terminal capability; and a transmitting unit that transmits the message for reporting the terminal capability to the base station.

According to the above-described configuration, depending on an operation mode of a network, the terminal 20 can report necessary MIMO UE capability to the network, and the terminal 20 can avoid reporting unnecessary MIMO UE capability. Namely, the network can obtain a report on terminal capability in a radio communication system.

The information for requesting the report on the terminal capability may include information for specifying a type of a codebook for reporting an additional parameter, and the control unit may configure information for reporting the additional parameter for the codebook corresponding to the type. According to this configuration, the terminal 20 can report an additional parameter for a type of a codebook required by the network.

The information for reporting the additional parameter for the codebook may include information for specifying a position in a list of information for configuring a supported resource of a reference signal for obtaining a channel state. By the above-described configuration, the terminal 20 can report, based on a specified list, an additional parameter for a type of a codebook required by the network.

When the list is present and the list is empty, the control unit may assume that a resource for a reference signal for obtaining a channel state supported by all codebooks is configured in the list. By the above-described configuration, the terminal 20 can report, based on a specified list, an additional parameter for a type of a codebook required by the network.

The information for reporting the additional parameter for the codebook may be configured on a per band and per band combination basis, and the information for reporting the additional parameter for the codebook configured per band combination may be applied to all bands included in the band combination. By the above-described configuration, the terminal 20 can report an additional parameter for a type of a codebook required by the network on a per band and per band combination basis.

Furthermore, according to the embodiments of the present invention, there is provided a communication method in which a terminal executes a receiving step of receiving, from a base station, a message for requesting a report on terminal capability; a control step of configuring information for reporting an additional parameter for a codebook based on the message for requesting the report on the terminal capability, and including the information for reporting the additional parameter for the codebook in a message for reporting the terminal capability; and a transmitting step of transmitting the message for reporting the terminal capability to the base station.

According to the above-described configuration, depending on an operation mode of a network, the terminal 20 can report necessary MIMO UE capability to the network, and the terminal 20 can avoid reporting unnecessary MIMO UE capability. Namely, the network can obtain a report on terminal capability in a radio communication system.

Supplemental Embodiments

While the embodiments of the present invention are described above, the disclosed invention is not limited to the embodiments, and those skilled in the art will appreciate various alterations, modifications, alternatives, substitutions, and the like. Descriptions are provided using specific numerical examples to facilitate understanding of the invention, but, unless as otherwise specified, these values are merely examples and any suitable value may be used. Classification of the items in the above descriptions is not essential to the present invention, and the items described in two or more items may be used in combination as needed, or the items described in one item may be applied to the items described in another item (provided that there is no contradiction). The boundaries of functional units or processing units in the functional block diagram do not necessarily correspond to the boundaries of physical components. An operation by a plurality of functional units may be physically performed by one component or an operation by one functional unit may be physically executed by a plurality of components. For the processing procedures described in the embodiment, the order of processing may be changed as long as there is no contradiction. For the convenience of the description of the process, the base station 10 and the terminal 20 are described using functional block diagrams, but such devices may be implemented in hardware, software, or a combination thereof. Software operated by a processor included in the terminal 20 in accordance with embodiments of the present invention and software operated by a processor included in the base station 10 in accordance with embodiments of the present invention may be stored in a random access memory (RAM), a flash memory (RAM), a read-only memory (ROM), an EPROM, an EEPROM, a register, a hard disk (HDD), a removable disk, a CD-ROM, a database, a server, or any other suitable storage medium, respectively.

Notification of information is not limited to the aspects/embodiments described in the disclosure, and notification of information may be made by another method. For example, notification of information may be implemented by physical layer signaling (e.g., Downlink Control Information (DCI), Uplink Control Information (UCI), higher layer signaling (e.g., Radio Resource Control (RRC) signaling, Medium Access Control (MAC) signaling, broadcast information (Master Information Block (MIB)), System Information Block (SIB)))), or other signals or combinations thereof. RRC signaling may be referred to as an RRC message, for example, which may be an RRC connection setup message, an RRC connection reconfiguration message, or the like.

The aspects/embodiments described in this disclosure may be applied to a system using at least one of Long Term Evolution (LTE), LTE-Advanced (LTE-A), SUPER 3G, IMT-Advanced, 4th generation mobile communication system (4G), 5th generation mobile communication system (5G), Future Radio Access (FRA), W-CDMA (Registered Trademark), GSM (Registered Trademark), CDMA2000, Ultra Mobile Broadband (UMB), IEEE 802.11 (Wi-Fi (Registered Trademark)), IEEE 802.16 (WiMAX (Registered Trademark)), IEEE 802.20, Ultra-WideBand (UWB), Bluetooth (Registered Trademark), any other appropriate system, and a next generation system extended based on theses. Additionally, a plurality of systems may be combined (e.g., a combination of at least one of LTE and LTE-A and 5G) to be applied.

The processing procedures, sequences, flow charts, or the like of each aspect/embodiment described in this disclosure may be reordered, provided that there is no contradiction. For example, the methods described in this disclosure present elements of various steps in an exemplary order and are not limited to the particular order presented.

The particular operation described in this specification to be performed by the base station 10 may be performed by an upper node in some cases. It is apparent that in a network consisting of one or more network nodes having the base stations 10, various operations performed for communicating with the terminal 20 may be performed by at least one of the base stations 10 and network nodes other than the base stations 10 (e.g., MME or S-GW can be considered, however, the network node is not limited to these). The case is exemplified above in which there is one network node other than the base station 10. However, the network node other than the base station 10 may be a combination of multiple other network nodes (e.g., MME and S-GW).

The information or signals described in this disclosure can be output from a higher layer (or lower layer) to a lower layer (or higher layer). It may be input and output through multiple network nodes.

Input and output information or the like may be stored in a specific location (e.g., memory) or managed using management tables. Input and output information or the like may be overwritten, updated, or added. Output information or the like may be deleted. The input information or the like may be transmitted to another device.

The determination in the disclosure may be made by a value (0 or 1) represented by 1 bit, by a true or false value (Boolean: true or false), or by comparison of numerical values (e.g., a comparison with a predefined value).

Software should be broadly interpreted to mean, regardless of whether referred to as software, firmware, middleware, microcode, hardware description language, or any other name, instructions, sets of instructions, code, code segments, program code, programs, subprograms, software modules, applications, software applications, software packages, routines, subroutines, objects, executable files, executable threads, procedures, functions, or the like.

Software, instructions, information, or the like may also be transmitted and received via a transmission medium. For example, when software is transmitted from a website, server, or other remote source using at least one of wireline technology (such as coaxial cable, fiber optic cable, twisted pair, digital subscriber line) and wireless technology (infrared and/or microwave), at least one of these wireline technology and wireless technology is included within the definition of a transmission medium.

The information, signals, or the like described in this disclosure may be represented using any of a variety of different techniques. For example, data, instructions, commands, information, signals, bits, symbols, chips, or the like, which may be referred to throughout the above description may be represented by voltages, currents, electromagnetic waves, magnetic fields or magnetic particles, optical fields or photons, or any combination thereof.

The terms described in this disclosure and those necessary for understanding this disclosure may be replaced by terms having the same or similar meanings. For example, at least one of the channels and the symbols may be a signal (signaling). The signal may also be a message. The component carrier may also be referred to as a carrier frequency, cell, frequency carrier, or the like.

As used in this disclosure, the terms "system" and "network" are used interchangeably.

The information, parameters, or the like described in the present disclosure may also be expressed using absolute values, relative values from predetermined values, or they may be expressed using corresponding separate information. For example, radio resources may be those indicated by an index.

The name used for the parameters described above are not restrictive in any respect. In addition, the mathematical equations using these parameters may differ from those explicitly disclosed in this disclosure. Since the various channels (e.g., PUCCH or PDCCH) and information elements can be identified by any suitable name, the various names assigned to these various channels and information elements are not in any way limiting.

In this disclosure, the terms "Base Station," "Radio Base Station," "Fixed Station," "NodeB," "eNodeB(eNB)," "gNodeB (gNB)," "Access Point," "Transmission Point," "Reception Point," "Transmission/Reception Point," "Cell," "Sector," "Cell Group," "Carrier," "Component Carrier," and the like may be used interchangeably. The base stations may be referred to in terms such as macro-cell, small-cell, femto-cell, pico-cell, or the like.

The base station can accommodate one or more (e.g., three) cells. Where the base station accommodates a plurality of cells, the entire coverage area of the base station can be divided into a plurality of smaller areas, each smaller area can also provide communication services by means of a base station subsystem (e.g., an indoor small base station (RRH) or a remote Radio Head). The term "cell" or "sector" refers to a portion or all of the coverage area of at least one of the base station and base station subsystem that provides communication services at the coverage.

In this disclosure, terms such as "mobile station (MS: Mobile Station)," "user terminal," "user equipment (UE: User Equipment)," "terminal," and the like may be used interchangeably.

The mobile station may be referred to by one of ordinary skill in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable term.

At least one of a base station and a mobile station may be referred to as a transmitter, receiver, communication device, or the like. At least one of a base station and a mobile station may be a device installed in a mobile body, a mobile body itself, or the like. The mobile body may be a vehicle (e.g., a car or an airplane), an unmanned mobile (e.g., a drone, or an automated vehicle), or a robot (manned or unmanned). At least one of a base station and a mobile station includes a device that does not necessarily move during communication operations. For example, at least one of a base station and a mobile station may be an Internet of Things (IoT) device such as a sensor.

In addition, the base station in the present disclosure may be read by the user terminal. For example, various aspects/embodiments of the present disclosure may be applied to a configuration in which communication between the base stations and the user terminal is replaced with communication between multiple user terminals 20 (which may be referred to as Device-to-Device (D2D) or Vehicle-to-Everything (V2X), for example). In this case, a configuration may be such that the above-described function of the base station 10 is included in the user terminal 20. The terms "up" and "down" may also be replaced with the terms corresponding to terminal-to-terminal communication (e.g., "side"). For example, an uplink channel, a downlink channel, or the like may be replaced with a sidelink channel.

Similarly, the user terminal in the present disclosure may be replaced with the base station. In this case, a configuration may be such that the above-described function of the user terminal may be included in the base station.

The terms "determine (determining)" and "decide (determining)" used in this disclosure may include various types of operations. For example, "determining" and "deciding" may include deeming that a result of judging, calculating, computing, processing, deriving, investigating, looking up (e.g., search in a table, a database, or another data structure), or ascertaining is determined or decided. Furthermore, "determining" and "deciding" may include, for example, deeming that a result of receiving (e.g., reception of information), transmitting (e.g., transmission of information), input, output, or accessing (e.g., accessing data in memory) is determined or decided. Furthermore, "determining" and "deciding" may include deeming that a result of resolving, selecting, choosing, establishing, or comparing is determined or decided. Namely, "determining" and "deciding" may include deeming that some operation is determined or decided. "Determine (decision)" may be replaced with "assuming," "expected," or "considering."

The term "connected" or "coupled" or any variation thereof means any direct or indirect connection or connection between two or more elements and may include the presence of one or more intermediate elements between two elements "connected" or "coupled" with each other. The coupling or connection between the elements may be physical, logical, or a combination of these. For example, "connection" may be replaced with "access". As used in the present disclosure, the two elements may be considered as being "connected" or "coupled" to each other using at least one of the one or more wires, cables, and printed electrical connections and, as a number of non-limiting and non-inclusive examples, electromagnetic energy having wavelengths in the radio frequency region, the microwave region, and the light (both visible and invisible) region.

The reference signal may be abbreviated as RS (Reference Signal) or may be referred to as a pilot, depending on the standard applied.

As used in this disclosure, the expression "based on" does not mean "based on only" unless otherwise specified. In other words, the expression "based on" means both "based on only" and "at least based on."

Any reference to elements using names, such as "first" and "second," as used in this disclosure does not generally limit the amount or order of those elements. These names can be used in this specification as a convenient way to distinguish between two or more elements. Accordingly, the reference to the first and second elements does not imply that only two elements can be adopted, or that the first element must precede the second element in some way.

The "means" in the configuration of each of the above-described devices may be replaced with "part," "circuit," or "device."

As long as "include," "including," and variations thereof are used in this disclosure, the terms are intended to be inclusive in a manner similar to the term "comprising." Furthermore, the term "or" used in the disclosure is intended not to be an exclusive OR.

A radio frame may be formed of one or more frames in the time domain. In the time domain, each of the one or more frames may be referred to as a subframe. A subframe may further be formed of one or more slots in the time domain. A subframe may be a fixed time length (e.g., 1 ms) that does not depend on numerology.

The numerology may be a communication parameter to be applied to at least one of transmission or reception of a signal or a channel. The numerology may represent, for example, at least one of a subcarrier spacing (SCS: SubCarrier Spacing), a bandwidth, a symbol length, a cyclic prefix length, a transmission time interval (TTI: Transmission Time Interval), a symbol number per TTI, a radio frame configuration, a specific filtering process performed by a transceiver in a frequency domain, a specific windowing process performed by a transceiver in a time domain, or the like.

A slot may be formed of, in a time domain, one or more symbols (Orthogonal Frequency Division Multiplexing (OFDM) symbols, Single Carrier Frequency Division Multiple Access (SC-FDMA) symbols, or the like). A slot may be a unit of time based on the numerology.

A slot may include a plurality of mini-slots. In a time domain, each mini-slot may be formed of one or more symbols. A mini-slot may also be referred to as a sub-slot. A mini-slot may be formed of fewer symbols than those of a slot. The PDSCH (or PUSCH) transmitted in a unit of time that is greater than a mini-slot may be referred to as PDSCH (or PUSCH) mapping type A. The PDSCH (or PUSCH) transmitted using a mini-slot may be referred to as PDSCH (or PUSCH) mapping type B.

Each of the radio frame, subframe, slot, mini-slot, and symbol represents a time unit for transmitting a signal. The radio frame, subframe, slot, mini-slot, and symbol may be called by respective different names.

For example, one subframe may be referred to as a transmission time interval (TTI: Transmission Time Interval), a plurality of consecutive subframes may be referred to as TTI, or one slot or one mini-slot may be referred to as TTI. Namely, at least one of a subframe and TTI may be a subframe (1 ms) in the existing LTE, may be a time interval shorter than 1 ms (e.g., 1 to 13 symbols), or a time interval longer than 1 ms. Note that the unit representing the TTI may be referred to as a slot, a mini-slot, or the like, instead of a subframe.

Here, the TTI refers to, for example, the minimum time unit of scheduling in radio communication. For example, in the LTE system, the base station performs scheduling for allocating radio resources (such as a frequency bandwidth, transmission power, or the like that can be used in each terminal 20) in units of TTIs to each terminal 20. Note that the definition of the TTI is not limited to this.

The TTI may be a transmission time unit, such as a channel coded data packet (transport block), a code block, a codeword, or may be a processing unit for scheduling, link adaptation, or the like. Note that, when a TTI is provided, a time interval (e.g., a symbol number) onto which a transport block, a code block, or a code ward is actually mapped may be shorter than the TTI.

Note that, when one slot or one mini-slot is referred to as a TTI, one or more TTIs (i.e., one or more slots or one or more mini-slots) may be the minimum time unit of scheduling. Additionally, the number of slots (the number of mini-slots) forming the minimum time unit of scheduling may be controlled.

A TTI with a time length of 1 ms may be referred to as an ordinary TTI (TTI in LTE Rel. 8-12), a normal TTI, a long TTI, an ordinary subframe, a normal subframe, a long subframe, a slot, or the like. A TTI that is shorter than a normal TTI may be referred to as a shortened TTI, a short TTI, a partial TTI (partial TTI or fractional TTI), a shortened subframe, a short subframe, a mini-slot, a sub-slot, a slot, or the like.

Note that a long TTI (e.g., a normal TTI, or a subframe) may be replaced with a TTI with a time length exceeding 1 ms, and a short TTI (e.g., a shortened TTI) may be replaced with a TTI with a TTI length that is shorter than the TTI length of the long TTI and longer than or equal to 1 ms.

A resource block (RB) is a resource allocation unit in the time domain and the frequency domain, and may include one or more consecutive subcarriers in the frequency domain. A number of subcarriers included in a RB may be the same irrespective of numerology, and may be 12, for example. The number of subcarriers included in a RB may be determined based on numerology.

Additionally, the resource block may include one or more symbols in the time domain, and may have a length of one slot, one mini-slot, one subframe, or one TTI. Each of one TTI and one subframe may be formed of one or more resource blocks.

Note that one or more RBs may be referred to as a physical resource block (PRB: Physical RB), a subcarrier group (SCG: Sub-Carrier Group), a resource element group (REG: Resource Element Group), a PRB pair, a RB pair, or the like.

Additionally, a resource block may be formed of one or more resource elements (RE: Resource Element). For example, 1 RE may be a radio resource area of 1 subcarrier and 1 symbol.

A bandwidth part (BWP: Bandwidth Part) (which may also be referred to as a partial bandwidth) may represent, in a certain carrier, a subset of consecutive common RB (common resource blocks) for a certain numerology. Here, the common RB may be specified by an index of a RB when a common reference point of the carrier is used as a reference. A PRB may be defined in a BWP, and may be numbered in the BWP.

The BWP may include a BWP for UL (UL BWP) and a BWP for DL (DL BWP). For a UE, one or more BWPs may be configured within one carrier.

At least one of the configured BWPs may be active, and the UE need not assume that a predetermined signal/channel is communicated outside the active BWP. Note that "cell," "carrier," or the like in the present disclosure may be replaced with "BWP."

The structures of the above-described radio frame, subframe, slot, mini-slot, symbol, and the like are only for illustration. For example, the following configurations can be variously changed: the number of subframes included in the radio frame; the number of slots per subframe or radio frame; the number of mini-slots included in the slot; the number of symbols and RBs included in the slot or mini-slot; the number of subcarriers included in the RB; and the number of symbols, the symbol length, the cyclic prefix (CP: Cyclic Prefix) length, or the like within the TTI.

In the present disclosure, for example, if an article is added by translation, such as a, an, and the in English, the present disclosure may include that the noun following the article is plural.

In the present disclosure, the term "A and B are different" may imply that "A and B are different from each other." Note that the term may also imply "each of A and B is different from C." The terms, such as "separated," "coupled," or the like may also be interpreted similarly.

The aspects/embodiments described in this disclosure may be used alone, in combination, or switched with implementation. Notification of predetermined information (e.g. "X" notice) is not limited to a method that is explicitly performed, and may also be made implicitly (e.g. "no notice of the predetermined information").

Note that, in the present disclosure, the "UECapability-Enquiry" is an example of a message for requesting a report on terminal capability. The "codebookTypeRequest" is an example of information for specifying a type of a codebook for reporting an additional parameter. The "UECapability-Information" is an example of a message for reporting terminal capability. The "CodebookParameters" is an example of information for reporting a parameter for a codebook. The CSI-RS is an example of a reference signal for obtaining a channel state. The "supportedCSI-RS-Resource" is an example of information for configuring a supported resource for a reference signal for obtaining a channel state. The "supportedCSI-RS-ResourceListAlt" is an example of information for reporting an additional parameter for a codebook.

Supplementary Note

As for the above-described embodiments, it can be additionally described as the following supplementary notes.

Supplementary Note 1

A terminal including a receiving unit that receives, from a base station, a message for requesting a report on terminal capability; a control unit that configures information for reporting an additional parameter for a codebook based on the message for requesting the report on the terminal capability, and that includes the information for reporting the additional parameter for the codebook in a message for reporting the terminal capability; and a transmitting unit that transmits the message for reporting the terminal capability to the base station.

Supplementary Note 2

The terminal according to the supplementary note 1, wherein the information for requesting the report on the terminal capability includes information for specifying a type of a codebook for reporting an additional parameter, and the control unit configures information for reporting the additional parameter for the codebook corresponding to the type.

Supplementary Note 3

The terminal according to the supplementary note 2, wherein the information for reporting the additional parameter for the codebook includes information for specifying a position in a list of information for configuring a supported resource of a reference signal for obtaining a channel state.

Supplementary Note 4

The terminal according to the supplementary note 3, wherein, when the list exists and the list is empty, the control unit assumes (determines) that a resource for a reference signal for obtaining a channel state supported by all codebooks is configured in the list.

Supplementary Note 5

The terminal according to the supplementary note 2, wherein the information for reporting the additional parameter for the codebook is configured on a per band and per band combination basis, and the information for reporting the additional parameter for the codebook configured per band combination is applied to all bands included in the band combination.

Supplementary Note 6

A communication method in which a terminal executes a receiving step of receiving, from a base station, a message for requesting a report on terminal capability; a control step of configuring information for reporting an additional parameter for a codebook based on the message for requesting the report on the terminal capability, and including the information for reporting the additional parameter for the codebook in a message for reporting the terminal capability; and a transmitting step of transmitting the message for reporting the terminal capability to the base station.

While the present disclosure is described in detail above, those skilled in the art will appreciate that the present disclosure is not limited to the embodiments described in the present disclosure. The disclosure may be implemented as modifications and variations without departing from the gist and scope of the disclosure as defined by the claims. Accordingly, the description of the present disclosure is for illustrative purposes only and is not intended to have any restrictive meaning with respect to the present disclosure.

This international patent application is based on and claims priority to Japanese Patent Application No. 2019-091761 filed on May 26, 2020, and the entire content of Japanese Patent Application No. 2019-091761 is incorporated herein by reference.

LIST OF REFERENCE SYMBOLS 10 base station
110 transmitting unit
120 receiving unit
130 configuration unit
140 control unit
20 terminal
210 transmitting unit
220 receiving unit 230 configuration unit
240 control unit
1001 processor
1002 storage device
1003 auxiliary storage device
1004 communication device
1005 input device
1006 output device

The invention claimed is:

1. A terminal comprising:
   a receiver that receives, from a base station, a message that requests a report on terminal capability;
   a processor that includes information for reporting a parameter for a codebook per band and information for reporting a parameter for a codebook per band combination in a message for reporting the terminal capability, the information for reporting the parameter for the codebook per band and the information for reporting the parameter for the codebook per band combination being included based on information for specifying a type of a codebook included in the message that requests the report on the terminal capability; and
   a transmitter that transmits the message for reporting the terminal capability to the base station,
   wherein the information for specifying the type of the codebook specifies Type1 single-panel, Type1 multi-panel, Type2, and Type 2 port selection, as the type of the codebook.

2. The terminal according to claim 1, wherein the processor includes information for configuring a resource for a reference signal for obtaining a channel state corresponding the type of the codebook in the parameter for the codebook.

3. The terminal according to claim 2, wherein the processor includes information for specifying a position of a list of the information for configuring the resource for the reference signal for obtaining the channel state in the parameter for the codebook.

4. The terminal according to claim 3, wherein, when the information for specifying the type of the codebook is present and the type of the codebook is unspecified, the processor configures, in the list, the resource for the reference signal for obtaining a channel state supported by all codebooks.

5. A base station comprising:
   a transmitter that transmits, to a terminal, a message that requests a report on terminal capability;
   a receiver that receives, from the terminal, a message for reporting the terminal capability including information for reporting a parameter for a codebook per band and information for reporting a parameter for a codebook per band combination, the information for reporting the parameter for the codebook per band and the information for reporting the parameter for the codebook per band combination being configured based on information for specifying a type of a codebook included in the message that requests the report on the terminal capability; and
   a processor that controls communication with the terminal based on the message for reporting the terminal capability,
   wherein the information for specifying the type of the codebook specifies Type1 single-panel, Type1 multi-panel, Type2, and Type 2 port selection, as the type of the codebook.

6. A communication method executed by a terminal, the method comprising:
   receiving, from a base station, a message that requests a report on terminal capability;
   including information for reporting a parameter for a codebook per band and information for reporting a parameter for a codebook per band combination in a message for reporting the terminal capability, the information for reporting the parameter for the codebook per band and the information for reporting the parameter for the codebook per band combination being included based on information for specifying a type of a codebook included in the message for requesting the report on the terminal capability; and
   transmitting the message for reporting the terminal capability to the base station,
   wherein the information for specifying the type of the codebook specifies Type1 single-panel, Type1 multi-panel, Type2, and Type 2 port selection, as the type of the codebook.

* * * * *